US007221126B1

(12) United States Patent
Williamson et al.

(10) Patent No.: US 7,221,126 B1
(45) Date of Patent: May 22, 2007

(54) APPARATUS AND METHOD TO ALIGN CLOCKS FOR REPEATABLE SYSTEM TESTING

(75) Inventors: Donald A. Williamson, Cupertino, CA (US); John A. Wickeraad, Granite Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/561,147

(22) Filed: Apr. 28, 2000

(51) Int. Cl.
*H04J 3/06* (2006.01)

(52) U.S. Cl. ...................................... 320/503

(58) Field of Classification Search .......... 370/395.62, 370/350, 503–507, 509–520; 713/400, 401, 713/500, 503; 714/700
See application file for complete search history.

(56) References Cited

U.S. PATENT DOCUMENTS 4,637,018 A * 1/1987 Flora et al. ................. 714/700
5,455,935 A * 10/1995 Taylor et al. ............... 713/401
5,696,951 A * 12/1997 Miller ........................ 713/503
6,449,728 B1 * 9/2002 Bailey ........................ 713/503

* cited by examiner

*Primary Examiner*—Dmitry Levitan

(57) ABSTRACT

A method and apparatus using a clock generator with sequential logic to align the phase of a first clock generated on a receiving integrated circuit (IC) chip to a second clock received by the receiving IC chip. One embodiment of the invention involves a method for aligning the phase of a first clock relative to the phase of a second clock, wherein the first clock is provided by a clock generator in a data processing system. The method includes sampling the second clock with a sampling clock, detecting an edge on the second clock, and stretching the first clock to align the phase of the first clock relative to the phase of the second clock. A second embodiment of the invention involves a data processing system including a transmitting chip, a receiving chip, and a clock generator for aligning the phase of a first clock relative to the phase of a second clock, wherein the second clock is received by the receiving chip. The clock generator includes a sampling circuit to sample the second clock with a sampling clock, a circuit to detect an edge on the second clock, and a sequential logic circuit to stretch the first clock to align the phase of the first clock relative to the phase of the second clock and control the clock generator.

17 Claims, 6 Drawing Sheets

APPARATUS AND METHOD TO ALIGN CLOCKS FOR REPEATABLE SYSTEM TESTING

BACKGROUND OF THE INVENTION

1. Field of the Invention

This invention relates generally to an improvement in synchronizing two clock domains, and more specifically to synchronizing two clock domains for repeatable testing of a data processing system.

2. Description of the Prior Art

In many data processing systems (e.g., computer systems, programmable electronic systems, telecommunication switching systems, control systems, and so forth) a link may be used to transfer data from one integrated circuit (IC) chip to another. If the IC chips are located far apart, they may operate with different clock sources, which have different clock phases and frequencies. In this case the link interface is considered asynchronous, and some type of synchronizing logic must be used between the two clock domains.

FIG. 1 illustrates a prior art approach for transmission and reception of data between a transmitting chip 130 and a receiving chip 132. External clock source A 160 outputs clock signal 4XCLKA 110 to internal divide-by-four clock generator 112, which outputs clock signal CLKA 114 to logic gate 116 and D flip-flop 124. Logic gate 116 outputs a clock signal to output driver 118, which outputs a clock signal LINK_CLKA 120 to receiving chip 132. Transmitting chip D flip-flop 124 receives data signal Data_A 122 and clock signal CLKA 114, and sends a data signal to output driver 126, which outputs a data signal LINK_Data 128 to receiving chip 132.

Receiving chip 132 receives a clock signal 4XCLKB 140 from external clock source B 162 with internal divide-by-four clock generator 142, which outputs clock signal CLKB 144 to D flip-flops 146 and 148. Receiver circuit 152 receives clock signal LINK_CLKA 120 and outputs a clock signal to D flip-flop 156. Receiver circuit 154 receives data signal LINK_Data 128 and outputs a data signal to D flip-flop 156. D flip-flop 156 outputs a data signal to D flip-flop 146, which outputs a data signal to D flip-flop 148. D flip-flop 148 outputs a data signal Data_B 150, which is synchronized to clock signal CLKB 144.

The prior art circuit of FIG. 1 shows a system where the two chip clocks (CLKA 114 and CLKB 144) are derived from two independent higher frequency clocks (4XCLKA 110 and 4XCLKB 140). Even if the 4X clocks are supposed to have identical frequencies, they will actually be slightly different. Furthermore, the divide by four clock generators may initialize differently. As a result, the rising edges of LINK_CLKA 120 and CLKB 144 may drift relative to each other. This may drop or stretch a cycle of Data_A when it appears at Data_B 150 output of synchronizing flip-flop 148 in receiving chip 132. There are well known techniques, including handshaking, first-in-first-out buffers, and Grey coding to deal with the uncertainties of crossing an asynchronous boundary. However, even with these techniques, the clock uncertainty means that a system test may fail differently on different test runs. It is desirable to have a repeatable test that always fails in the same way to simplify system debugging.

A first step to improve test repeatability is to send the 4XCLKA 110 signal to both IC chips and use it in place of 4XCLKB 140 on the receiving chip 132. Now the clock frequency for both IC chips is identical, but the phase of the two clocks is unknown. If the clock phase is such that the rising edges of LINK_CLKA 120 and CLKB 144 are far apart, the system will be repeatable during testing.

However, there are cases when the clock generators power up in a certain way and the delay in the clock signal 4XCLKA 110 cable is just right, that the rising edges of the LINK_CLKA 120 and CLKB 144 are very close to each other. In this case the synchronizer logic uncertainty may again cause unrepeatable test results.

It would be desirable to have the capability to repeatably test a system to determine the cause of failure. It would also be desirable to make a phase-unknown system design fully synchronous during normal operations, thereby avoiding some the problems encountered with asynchronous system designs.

SUMMARY OF THE INVENTION

An object of the invention is to provide the capability to repeatably test a system to determine the cause of failure.

Another object of the invention is to make a phase-unknown system design fully synchronous during normal operations, thereby avoiding some the problems encountered with asynchronous system designs.

A first aspect of the invention is directed to a method for aligning the phase of a first clock having a first phase relative to the phase of a second clock having a second phase, wherein the first clock is provided by a clock generator in a data processing system. The method includes the steps of sampling the second clock with a sampling clock, detecting an edge on the second clock, and stretching the first clock with the clock generator to align the first phase of the first clock relative to the second phase of the second clock.

A second aspect of the invention is directed to a data processing system comprising a transmitting chip, a receiving chip, and a clock generator for aligning the phase of a first clock having a first phase relative to the phase of a second clock having a second phase, wherein second clock is received by the receiving chip. The clock generator includes a sampling circuit to sample the second clock with a sampling clock, a circuit to detect an edge on the second clock, and a sequential logic circuit to stretch the first clock to align the first phase of the first clock relative to the second phase of the second clock and control said clock generator.

These and other objects and advantages of the invention will become apparent to those skilled in the art from the following detailed description of the invention and the accompanying drawings.

DETAILED DESCRIPTION OF PREFERRED EMBODIMENTS OF THE INVENTION

This invention provides an apparatus and method for providing the capability to repeatably test a system to determine the cause of failure. This invention can also make a phase-unknown system design fully synchronous during normal operations, thereby avoiding some the problems encountered with asynchronous system designs.

In one preferred embodiment of the invention, there is a clock generator with stall logic in the receiving IC chip. In alternative embodiments, there could be one or more clock generators with stall logic in the receiving IC chip. Furthermore, one preferred embodiment of the invention uses a divide-by-four clock generator with two different clock outputs that are used by various circuits in the receiving IC chip. Alternative embodiments of the invention could use clock generators other than divide-by-four clock generators and could have an arbitrary number of clock outputs.

Figure 1:
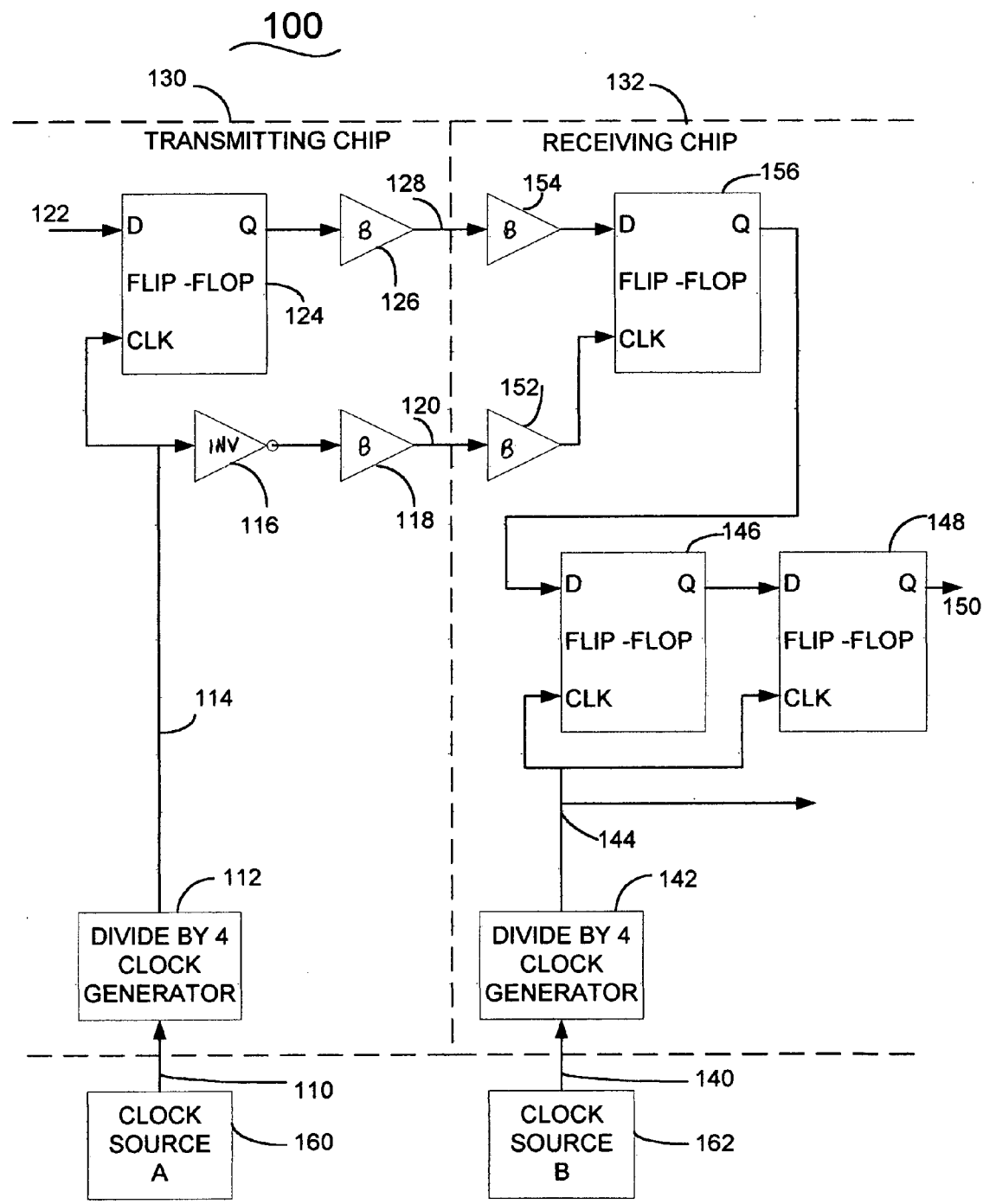
FIG. 1 illustrates a prior art approach for transmission and reception of data between a transmitting chip and a receiving chip.
Figure 2:
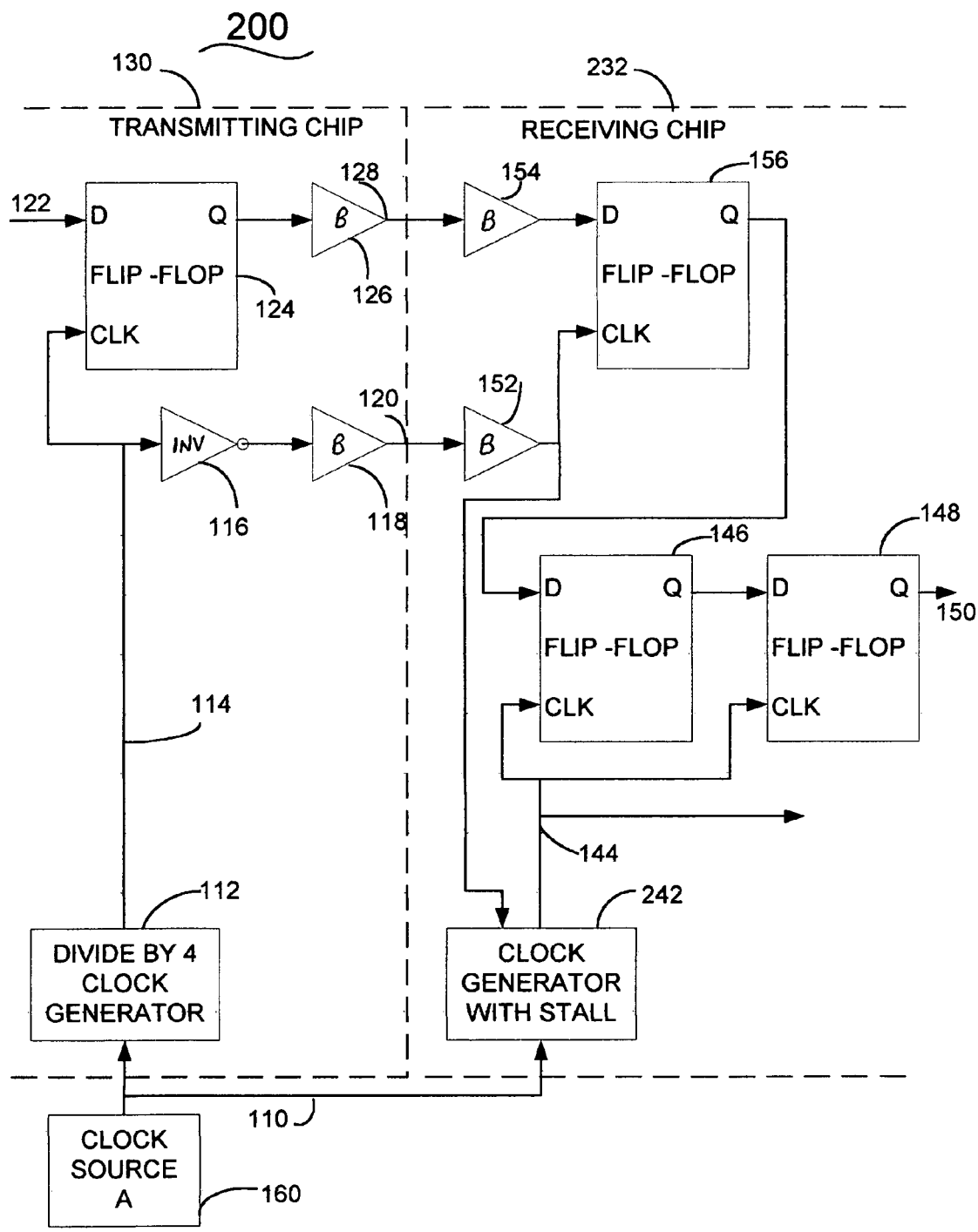
FIG. 2 illustrates one preferred embodiment of the invention for transmission and reception of data between a transmitting chip and a receiving chip.

FIG. 2 illustrates one preferred embodiment of the invention for transmission and reception of data between a transmitting chip 130 and a receiving chip 232. External clock source A 160 outputs a clock signal 4XCLKA 110 to internal divide-by-four clock generator 112, which outputs clock signal CLKA 114 to logic gate 116 and D flip-flop 124. Logic gate 116 outputs a clock signal to output driver 118, which outputs a clock signal LINK_CLKA 120 to receiving chip 232. Transmitting chip D flip-flop 124 receives data signal Data_A 122 and clock signal CLKA 114, and sends a data signal to output driver 126, which outputs a data signal LINK_Data 128 to receiving chip 232.

Receiving chip 232 receives clock signal 4XCLKA 110 from the same external clock source A 160 using internal divide-by-four clock generator 242, which outputs clock signal CLKB 144 to D flip-flops 146 and 148. Receiver circuit 152 receives clock signal LINK_CLKA 120 and outputs a clock signal received by D flip-flop 156 and internal clock generator 242. Receiver circuit 154 receives data signal LINK_Data 128 and outputs a data signal to D flip-flop 156. D flip-flop 156 outputs a data signal to D flip-flop 146, which outputs a data signal received by D flip-flop 148. D flip-flop 148 outputs a data signal Data_B 150, which is synchronized to clock signal CLKB 144. The memory cells in the receiving IC chip can be implemented with flip-flops, latches, random access memory, or programmable memory, such as flash memory.

The circuit shown in FIG. 2 can be used to make the double D flip-flop synchronizer composed of D flip-flops 146 and 148 work repeatably during system testing. It includes the shared clock source A 160 and a new clock generator circuit in the receiving chip 232. This clock generator 242 includes a clock stretch feature. When enabled, the clock stretcher watches the clock signal LINK_CLKA 120, and stretches one phase of clock signal CLKB 144 until the clocks have a desired phase relationship, and then it releases clock signal CLKB 144 to free-run normally. The most commonly used phase relationship is that the fall of the clock signal LINK_CLKA 120 coincides with the rise of clock signal CLKB 144. For a divide-by-four clock generator, this produces between 25% to 50% of a clock cycle margin between the two clock edges. This is normally enough to insure that the synchronizer always behaves repeatably.

Figure 3:
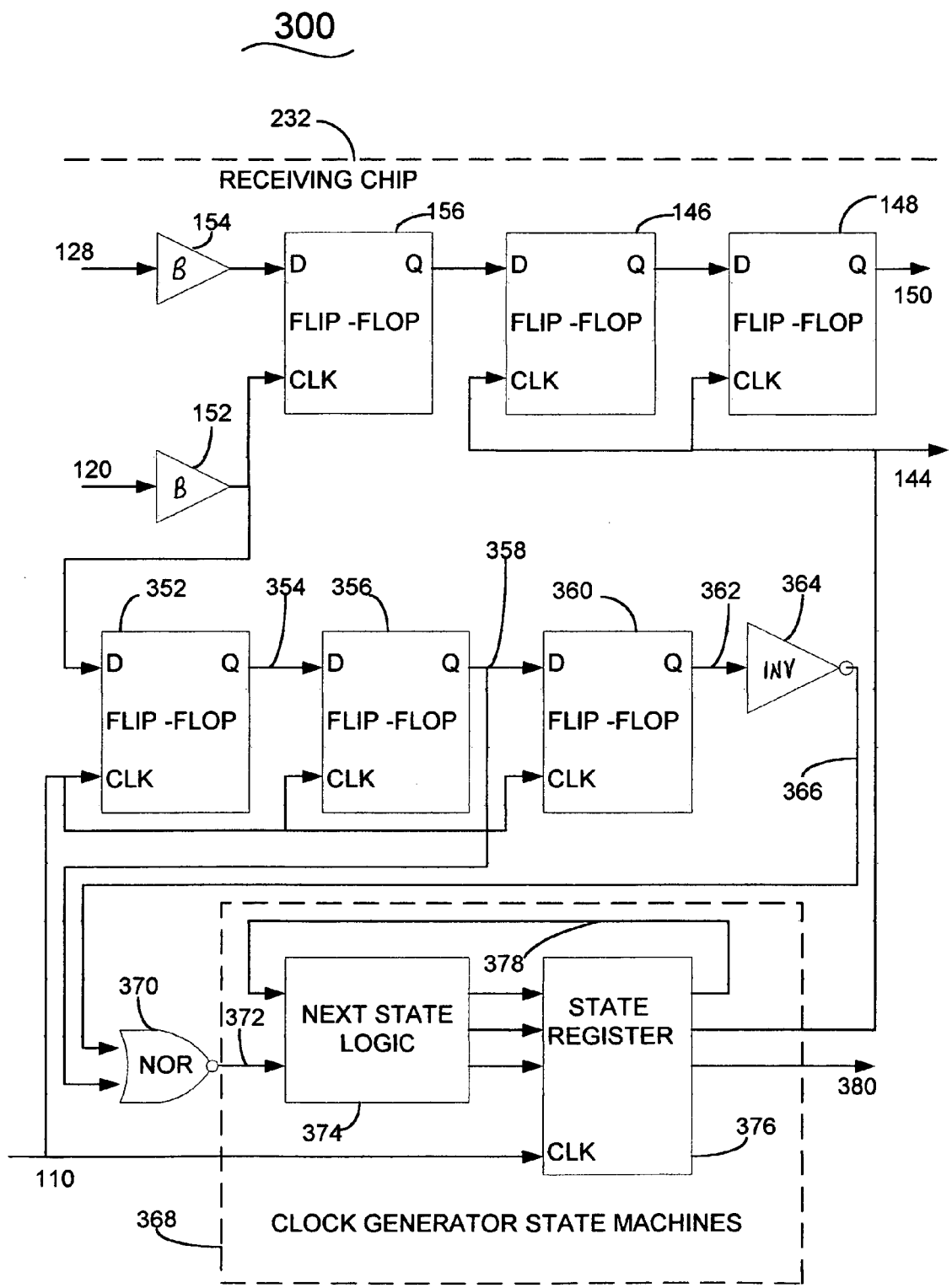
FIG. 3 illustrates in more detail of the preferred embodiment of the invention shown in FIG. 2.

FIG. 3 illustrates in a more detailed view 300 of the preferred embodiment of the invention shown in FIG. 2. Receiver circuit 152 receives clock signal LINK_CLKA 120 and outputs a signal to the clock input of D flip-flop 156, and the data input of D flip-flop 352. Receiver circuit 154 receives data signal LINK_Data 128 and outputs a data signal to D flip-flop 156. D flip-flop 156 outputs a data signal to D flip-flop 146, which outputs a data signal received by D flip-flop 148; D flip-flop 148 outputs a data signal Data_B 150, which is synchronized to clock signal CLKB 144. The clock generator state machines 368 output clock signal CLKB 144 as a clock input to D flip-flops 146 and 148.

Clock generator state machines 368 include next state logic 374 and state register 376, which outputs feedback signals 378 to next state logic 374. State register 376, D flip-flop 352, D flip-flop 356, and D flip-flop 360 receive the clock signal 4XCLKA 110 from the external clock source A 160 (not shown). D flip-flop 352 outputs CLKA_SYNC 354 to the input of D flip-flop 356, which outputs CLKA_DLY1 358, which D flip-flop 360 and logical NOR gate 370 receive as an input signal. D flip-flop 360 outputs CLKA_DLY2 362, which is received by inverter 364. Inverter 364 outputs a signal 366, which is received by logical NOR gate 370. Logical NOR gate 370 asserts a CLKA_PULSE 372 signal when the CLKA_DLY1 358 signal is low and CLKA_DLY2 362 is high, and this is received by next state logic 374. Next state register 376 outputs CLKB 144, feedback signals 378, and CLKC 380. In one preferred embodiment of the invention, clock generator state machines 368 generate output clock signals CLKB 144 and CLKC 380 with two different phases and duty cycles. Alternative embodiments could generate a different number of clock signals.

The output clocks CLKB 144 and CLKC 380 are synchronized to LINK_CLKA 120 by sampling LINK_CLKA 120 with the clock signal 4XCLKA 110, and choosing the most optimal 4XCLKA cycle to place CLKC 380 and CLKB 144 relative to LINK_CLKA 120. When the output clocks CLKB 144 and CLKC 380 first power up, they have an unknown phase relationship to LINK_CLKA 120. After initialization, the clock generator state machines 368 will "stall" CLKB 144 and CLKC 380 to align them relative to LINK_CLKA 120.

Figure 4:
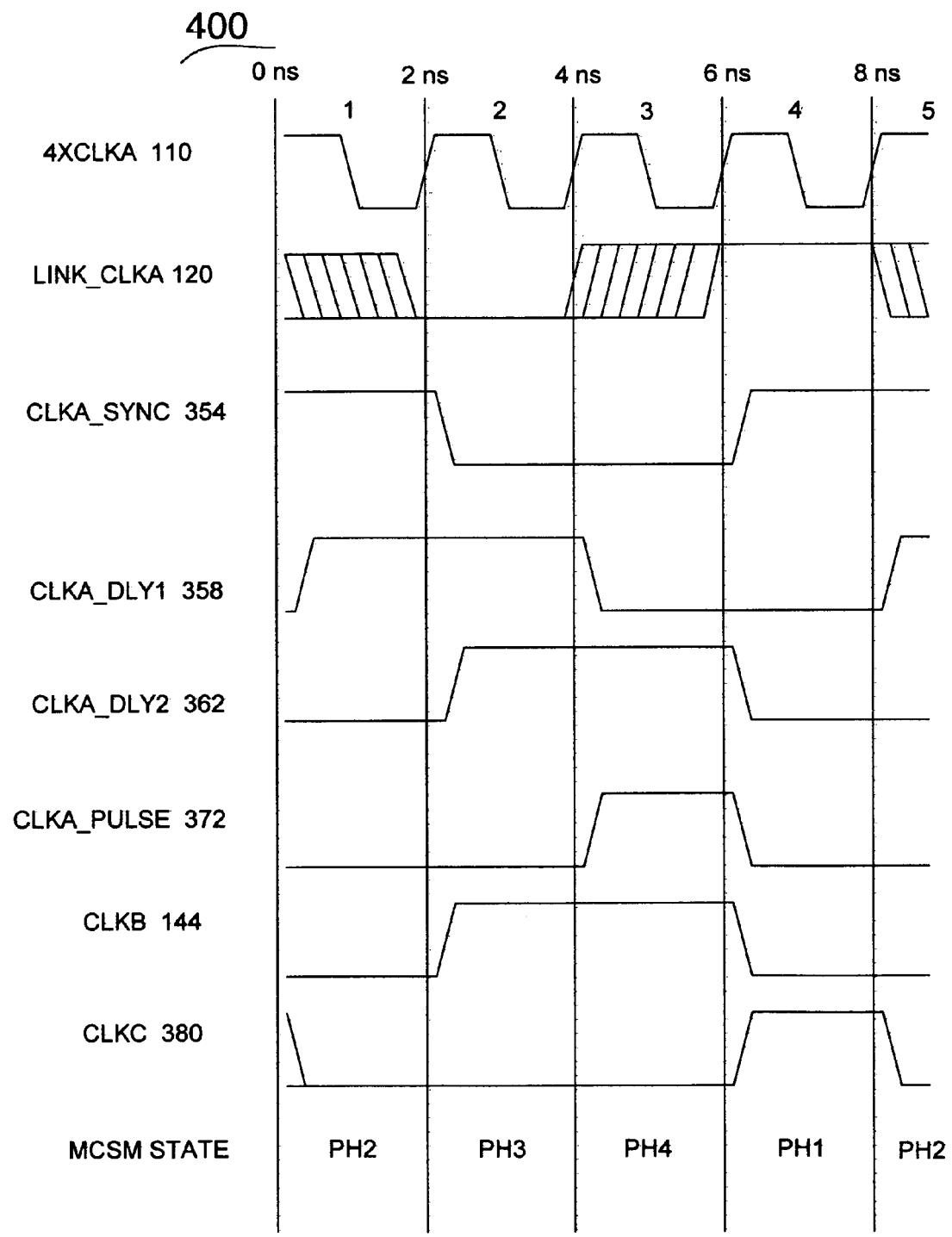
FIG. 4 shows the clocks after they have been aligned.

FIG. 4 shows the wave forms of the signals from FIG. 3 after the clocks have been aligned. The LINK_CLKA 120 signal is shown with 2 nanoseconds (ns) of uncertainty in cross-hatching, because in repeatability mode the clock generator state machines 368 will choose the closest 4XCLKA 110 rising edge when sampling LINK_CLKA 120 to which to align the rest of the clock signals. Signal CLKA_SYNC 354 is LINK_CLKA 120 sampled by 4XCLKA 110. Signal CLKA_DLY1 358 is CLKA_SYNC 354 sampled by 4XCLKA 110, and is delayed by one clock cycle. Signal CLKA_DLY2 362 is CLKA_DLY1 358 sampled by 4XCLKA 110, and is delayed by one clock cycle. The CLKA_PULSE 372 signal is high when the CLKA_DLY1 358 signal is low and CLKA_DLY2 362 is high.

CLKB 144 is the main clock output of the clock generator state machines 368. The rising edge of CLKB 144 is 1 to 2 cycles of 4XCLKA 110 (2 to 4 nanoseconds in this example) away from the rising edge of LINK_CLKA 120. This allows CLKB 144 to safely sample data that has been clocked by LINK_CLKA 120.

CLKC 380 is another clock output that has a different phase and duty cycle from CLKB 144. It is included in this implementation to show that the clock generator state machines 368 can generate a variety of clocks, each clock with its own selected alignment to LINK_CLKA 120.

Figure 5:
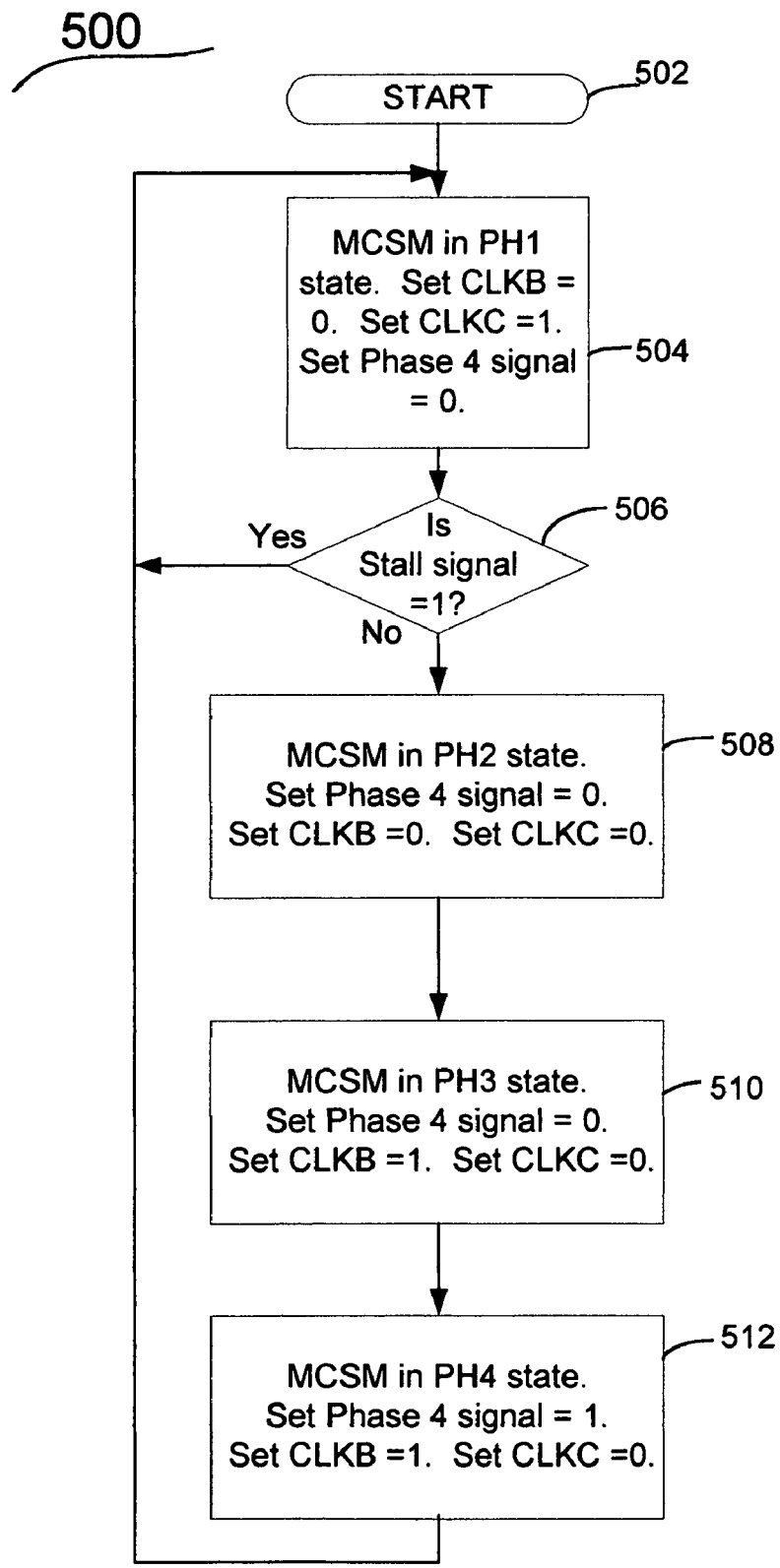
FIG. 5 shows one flow chart for the main clock state machine of the clock generator state machines, in accordance with one embodiment of the present invention.

FIG. 5 shows one flow chart 500 for the clock generator state machines 368 shown in FIG. 3 in accordance with one embodiment of the present invention. The Main Clock State Machine (MCSM) of the clock generator state machines 368, which normally runs free through four clock phases, is clocked by 4XCLKA. The method starts in operation 502, then is followed by operation 504. In operation 504, the MCSM of the clock generator is in the PH1 state. The MCSM sets a phase 4 signal to logical 0 to de-assert the phase 4 signal, sets CLKB to logical 0, and sets CLKC to logical 1. In operation 506, a test is performed to determine if the stall signal is asserted by the Stall State Machine of the clock generator state machines 368 (discussed below). If it is asserted, then operation 504 is repeated. If it is not asserted, then operation 508 is performed. In operation 508, the MCSM is in the PH2 state. The MCSM sets the phase 4 signal to logical 0 to de-assert the phase 4 signal, sets CLKB to logical 0, and sets CLKC to logical 0. Then operation 510 is next. In operation 510, the MCSM is in the PH3 state. The MCSM sets a phase 4 signal to logical 0 to de-assert the phase 4 signal, sets CLKB to logical 1, and sets CLKC to logical 0. Then operation 512 is next. In operation 512, the MCSM is in the PH4 state. The MCSM sets the phase 4 signal to logical 1 to assert the phase 4 signal, sets CLKB to logical 1, and sets CLKC to logical 0. Operation 504 is next.

This sequence of operations generates the output clocks. It is easy to change the phase and duty cycles of the output clocks in this preferred embodiment by changing the values they are assigned in each of the four phases. More clocks can be added to the MCSM by adding additional clock assignments in each of the four phases. Clocks with longer periods can be added by increasing the number of phases in the MCSM.

Figure 6:
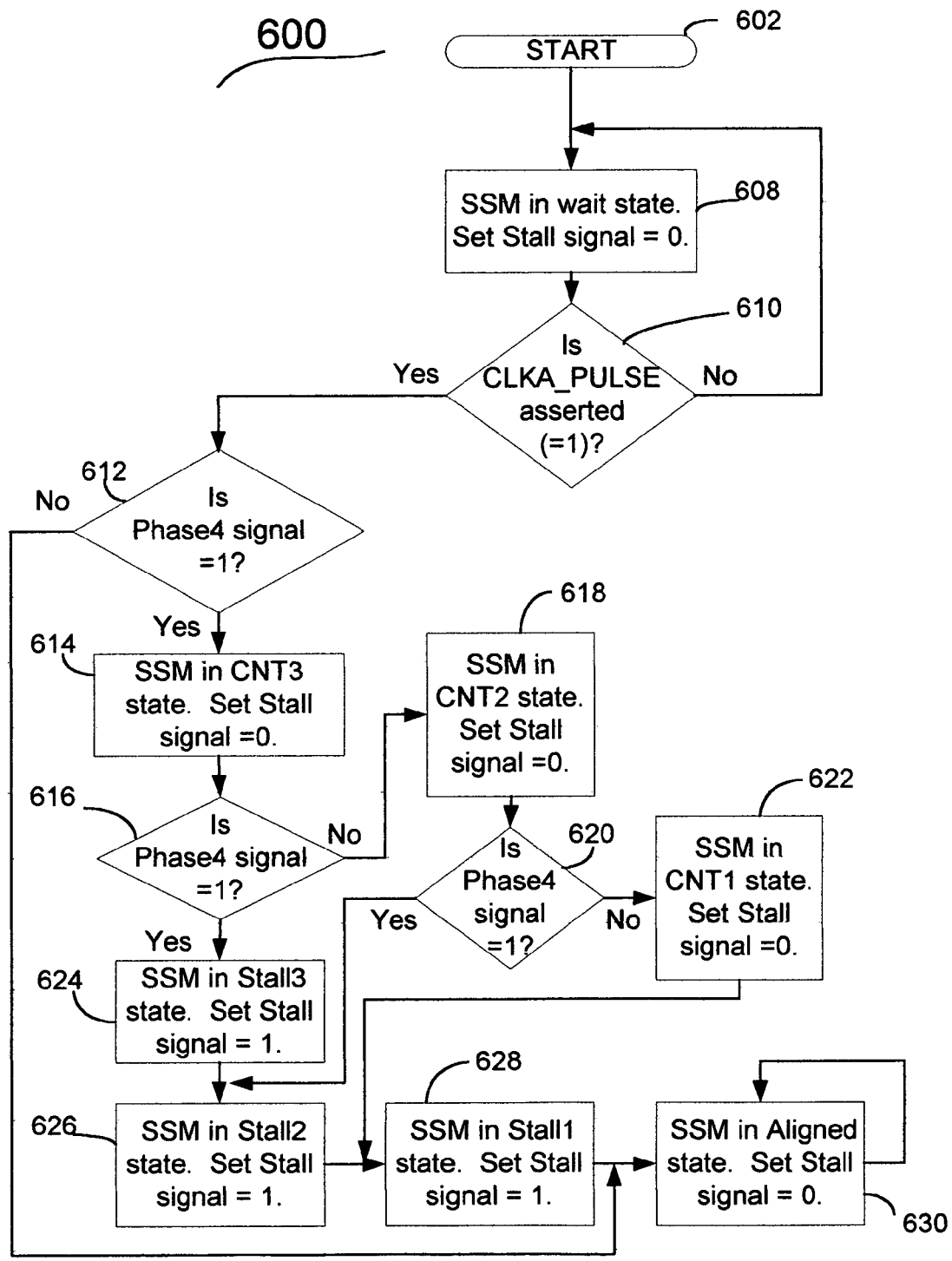
FIG. 6 shows another flow chart for the stall state machine in the clock generator state machines, in accordance with one embodiment of the present invention.

FIG. 6 shows another flow chart 600 for the clock generator state machines 368 shown in FIG. 3 in accordance with one embodiment of the present invention. The Stall State Machine (SSM) in the clock generator state machines 368 is also clocked by 4XCLKA. The method starts in operation 602, and is followed by operation 608. In operation 608, the SSM is in the wait state. The SSM sets a stall signal to logical 0 to de-assert the stall signal. In operation 610, a test is performed by the SSM to see if the CLKA_PULSE signal is asserted (set to logical 1).

If it is not asserted, then operation 608 is repeated. If it is asserted, then operation 612 is next, where a test is performed to determine if the phase 4 signal is asserted (set to logical 1). If the phase 4 signal is not asserted, then operation 630 is next, where the SSM is in the aligned state and sets the stall signal to 0. But if the phase 4 signal is asserted in operation 612, then operation 614 is next. In operation 614, the SSM is in the CNT3 state and it sets the stall signal to 0. Then operation 616 is next, where a test is performed to determine if the phase 4 signal is asserted. If the phase 4 signal is asserted, then operation 624 is next, where the SSM is in the stall 3 state and sets the stall signal to logical 1. Then operation 626 is next, where the SSM is in the stall 2 state and it sets the stall signal to logical 1, and proceeds to operation 628.

However, if the phase 4 signal is not asserted during the test of operation 616, then operation 618 is next. In operation 618, the SSM is in the CNT2 state and it sets the stall signal to 0. Then operation 620 is next, where a test is made to determine if the phase 4 signal is asserted. If the phase 4 signal is asserted then operation 626 is next. If the phase 4 signal is not asserted during the test of operation 620, then operation 622 is next. In operation 622, the SSM is in the CNT1 state and it sets the stall signal to 0. Then operation 628 is next, where the SSM is in the stall 1 state and it sets the stall signal to logical 1. Operation 628 is followed by operation 630, where the SSM is in the aligned state and it sets the stall signal to logical 0. Then operation 630 repeats. The preferred embodiment implements the clock generator using a pair of cooperating state machines. Other embodiments could use other sequential logic design techniques to implement the functionality encapsulated by the state machines.

The most preferred embodiment of the invention uses registers to implement the clock generator state machines 368. However, alternative embodiments of the invention could use other types of volatile or non-volatile memory cells (e.g., discrete flip-flops, discrete latches, random access memory, magnetic memory, or programmable memory, such as flash memory).

The exemplary embodiments described herein are for purposes of illustration and are not intended to be limiting. Therefore, those skilled in the art will recognize that other embodiments could be practiced without departing from the scope and spirit of the claims set forth below.

What is claimed is:

1. A method for providing a clock cycle margin between the phase of a first clock having a first phase relative to the phase of a second clock having a second phase such that synchronization behaves repeatedly, wherein said first clock is provided by a clock generator in a data processing system, comprising steps of:

sampling said second clock with a sampling clock;

detecting an edge on said second clock; and stretching said first clock with said clock generator to provide a clock cycle margin between said first phase of said first clock relative to said second phase of said second clock, wherein a falling edge of said first clock is stretched to coincide with a rising edge of said second clock and a clock margin is in the range of approximately 25% to 50% of the clock cycle margin between the two clock edges thereby providing repeatable synchronizing behavior between said first clock and said second clock, and wherein said step of stretching said first clock with said clock generator further comprises stalling said first clock for a selected number of cycles of said sampling clock, wherein said stretching of said first clock to generate the offset clock cycle margin is utilized to ensure repeatability when testing a system to determine a cause of failure.

2. The method of claim 1, wherein said step of stretching said first clock with said clock generator further comprises determining how many stall cycles are required to align said first phase of said first clock relative to said second phase of said second clock.

3. The method of claim 1, wherein said step of stretching said first clock with said clock generator further comprises outputting said first clock from said clock generator.

4. The method of claim 1, further comprising the step of testing said data processing system while said first phase of said first clock is aligned to said second phase of said second clock.

5. The method of claim 1, wherein said stalling said first clock comprises selectively stalling said first clock in an asserted state or a de-asserted state.

6. The method of claim 1, further comprising the step of outputting a plurality of clock signals, each having a phase aligned to said second phase of said second clock.

7. A data processing system, comprising a transmitting chip, a receiving chip, and a clock generator for providing a clock cycle margin between the phase of a first clock having a first phase relative to the phase of a second clock having a second phase such that synchronization behaves repeatedly, wherein said second clock is received by said receiving chip, and said first clock is generated by said clock generator, wherein said clock generator includes:
- a sampling circuit to sample said second clock with a sampling clock;
- a circuit to detect an edge on said second clock; and
- a sequential logic circuit to stretch said first clock to provide a clock cycle margin between said first phase of said first clock relative to said second phase of said second clock, and control said clock generator, wherein said sequential logic circuit to stretch said first clock to align said first phase of said first clock relative to said second phase of said second clock, wherein a falling edge of said first clock is stretched to coincide with a rising edge of said second clock and a clock margin is in the range of approximately 25% to 50% of the clock cycle margin between the two clock edges thereby providing repeatable synchronizing behavior between said first clock and said second clock, wherein said data processing system further includes a sequential logic circuit which stalls said first clock for a determined number of cycles of said sampling clock, wherein said stretching of said first clock to generate the offset clock cycle margin is utilized to ensure repeatability when testing a system to determine a cause of failure.

8. The data processing system of claim 7, wherein said circuit to detect an edge on said second clock includes a sequential logic circuit to generate a delayed version of said second clock.

9. The data processing system of claim 8, wherein said circuit to detect an edge on said second clock further includes a combinational logic circuit to compare said second clock to said delayed version of said second clock.

10. The data processing system of claim 7, wherein said sequential logic circuit which stalls said first clock determines how many stall cycles are required to align said first phase of said first clock relative to said second phase of said second clock.

11. The data processing system of claim 7, wherein said sequential logic circuit which stalls said first clock further comprises a circuit to selectively stall said first clock in an asserted state or a de-asserted state.

12. The data processing system of claim 7, wherein said sequential logic circuit to stretch said first clock includes a plurality of state machines implemented in a next state logic circuit and a state register.

13. A receiving chip, comprising:
- a circuit for providing a clock cycle margin between the phase of a first clock having a first phase relative to the phase of a second clock having a second phase such that synchronization behaves repeatedly, wherein said first clock is provided by a clock generator in said receiving chip, said circuit including:
  - a sampling circuit to sample said second clock with a sampling clock;
  - a stall circuit to stretch said first clock to provide a clock cycle margin between said first phase of said first clock relative to said phase of said second clock, wherein a falling edge of said first clock is stretched to coincide with a rising edge of said second clock and a clock margin is in the range of approximately 25% to 50% of the clock cycle margin between the two clock edges thereby providing repeatable synchronizing behavior between said first clock and said second clock, wherein said stretching of said first clock to generate the offset clock cycle margin is utilized to ensure repeatability when testing a system to determine a cause of failure; and
  - a sequential logic circuit to control said stall circuit, wherein said sequential logic circuit determines how many stall cycles are required to provide a clock cycle margin between said first phase of said first clock relative to said second phase of said second clock.

14. The receiving chip of claim 13, further comprising a circuit to detect an edge on said second clock.

15. The receiving chip of claim 14, wherein said circuit to detect an edge on said second clock includes a sequential logic circuit to output a delayed version of said second clock.

16. The receiving chip of claim 15, wherein said circuit to detect an edge on said second clock further includes a combinational logic circuit to compare said second clock to said delayed version of said second clock.

17. The receiving chip of claim 13, wherein said stall circuit can selectively stall said first clock in a high voltage state or a low voltage state.

* * * * *